Patented Oct. 21, 1941

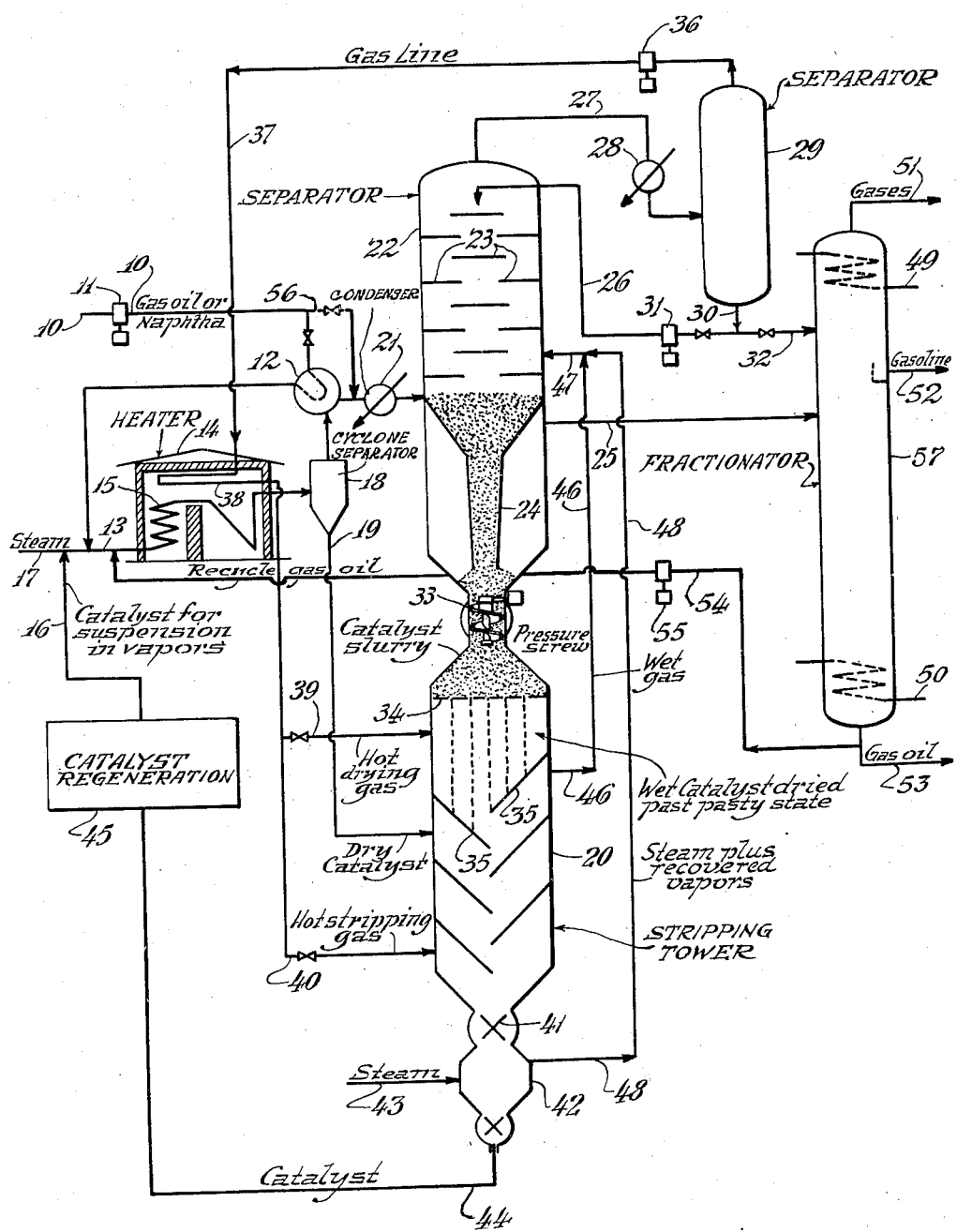

2,259,487

UNITED STATES PATENT OFFICE 2,259,487

CATALYST RECOVERY

Donald E. Payne, Chicago, Ill., assignor to Standard Oil Company, Chicago, Ill., a corporation of Indiana Application September 13, 1939, Serial No. 294,787

16 Claims. (Cl. 196—52)

This invention relates to catalyst recovery and it pertains more particularly to the recovery of powdered catalysts employed in hydrocarbon conversion processes such as catalytic cracking, reforming, dehydrogenation, aromatization, alkylation, desulfurization, polymerization, isomerization, etc.

Catalytic hydrocarbon conversion processes may be of three general types: fixed bed, moving bed or suspended powder. The fixed bed and moving bed systems employ granular catalysts of relatively large particle size or catalysts which are pelleted, molded, extruded or otherwise formed into unitary masses of about ⅛ to ⅜ of an inch in thickness. Both the fixed and moving bed systems require complicated and expensive apparatus. In fixed bed systems conversion conditions are constantly changing, the temperature fluctuations impose a severe strain on the apparatus; temperature control and heat utilization during regeneration are very difficult and the capacity of the system is materially limited due to the long shut-down periods required for purging and regeneration. Moving bed systems offer the advantage of substantially constant operating conditions but they present the further problems of catalyst handling means and catalyst disintegration in transit. Powdered catalyst systems avoid many of the difficulties of both fixed bed and moving bed systems and in addition offer advantages of less coke and gas formation, better product distribution, larger overall yields and higher qualities of finished motor fuel. Powdered catalyst systems, however, give rise to the problem of completely separating and recovering the finely divided catalyst material from oil and vapors. The object of this invention is to provide an improved method for effecting such complete separation and recovery of powdered catalyst.

Since about 1 to 15 or more volumes of catalyst are employed for each volume of liquid oil treated it is obvious that even a small percentage of catalyst loss will result in enormous overall catalyst losses. Thus a 5000 barrel per day plant with a catalyst loss of only .5% will require about 4 tons to 50 tons per day of makeup catalyst to compensate for catalyst losses. If the catalyst material retains as much as 3 or 4% of absorbed oil when it is withdrawn for regeneration the daily oil loss may be from 6 to 8 thousand gallons. The object of my invention is to provide a simple and efficient method for eliminating both catalyst losses and oil losses in a powdered hydrocarbon conversion process. A further object is to decrease the capital and operating costs and to increase the efficiency of powdered catalyst systems.

A further object is to provide a powdered catalyst system with maximum thermal efficiency. A further object is to minimize the amount of steam required for catalyst stripping and to utilize gases produced in a conversion process for effecting the removal of oil from spent catalyst. A further object is to provide an improved method for avoiding difficulties in catalyst handling due to the sticky or pasty state through which the catalyst passes when oil is removed from a catalyst slurry. A further object is to provide improved method for separating liquids from finely divided catalyst particles suspended therein and for completely freeing said catalyst from said liquids prior to catalyst regeneration.

A further object is to provide an improved combination of wet and dry catalyst separation steps whereby substantially complete catalyst recovery can be effected without the necessity of employing electrical precipitators or other expensive apparatus which is undesirable from the cost or safety standpoint in oil refineries. Other objects will be apparent as the detailed description of the invention proceeds.

In applying my invention to catalytic cracking I pass a powdered catalyst suspended in oil vapors through a reaction tube at about 800 to 1000° F., preferably about 900 to 925° F., allowing a time of contact of about 5 to 50 seconds, preferably about 15 to 25 seconds at a pressure of about atmospheric to 50 pounds, preferably about 25 pounds per square inch. The bulk of the powdered catalyst which may be about 90 to 95% is removed from the hot hydrocarbon vapors in a cyclone separator and passed to a stripping zone. The hydrocarbon vapors with the remaining catalyst material are then partially condensed so that the catalyst is suspended in the condensed liquid. This liquid is introduced into a separating zone in which entrained catalyst material is scrubbed out of the vapors and from which catalyst-free oil and vapors are withdrawn for fractionation. The wet catalyst slurry is forced to a drying and stripping zone. The drying is preferably effected by extruding or otherwise disseminating the slurry into a rapidly moving stream of hot hydrocarbon gases so that the catalyst passes from the fluid state to substantially dry state while passing through the gaseous atmosphere. Final traces of oil are then removed from the catalyst discharged from the cyclone separator and the catalyst discharged from the hot vapor drying zone, the recovered oil being returned to the system.

The amount of steam may be limited to that required for removing the stripping gas from the catalyst prior to its regeneration for reuse. A feature of the invention is the use of gases produced in the system for effecting the drying and stripping of the catalyst material. Other features of the invention will be apparent as the following detailed description thereof proceeds.

The accompanying drawing which forms a part of the specification is a flow diagram of an improved powdered catalyst system with parts of the separating and drying elements shown in vertical section.

While the invention will be described in connection with catalytic cracking it should be understood that it is applicable to catalytic reforming, dehydrogenation, aromatization, desulfurization, isomerization, alkylation, polymerization, etc. i. e. to any hydrocarbon conversion processes employing powdered catalysts which require periodic regeneration.

The nature of the charging stock depends upon the particular conversion process employed and in the case of cracking I prefer to employ a Mid-Continent, West Texas or East Texas gas oil. Such gas oil is charged through line 10 by pump 11 through heat exchanger 12 and line 13 to coils 15 in pipe still 14. Powdered catalyst is injected into line 13 from line 16, preferably by the use of superheated steam from line 17. Any conventional method of catalyst injection may be employed and if desired the catalyst may be introduced as a slurry into the incoming oil charge. Alternatively, the catalyst may be injected into the oil after it has reached conversion temperature. I prefer to introduce hot regenerated catalyst into the oil entering the pipe still or reaction chamber so that the heat retained by the catalyst may be imparted to the oil. The reaction chamber may constitute coils 15 in the pipe still as illustrated in the drawing, or may be an insulated conduit or chamber connected to the transfer line of the pipe still.

The catalyst for cracking is preferably of the activated clay or synthetic silica-alumina types. The clay type catalysts are preferably acid-treated clays of the type commonly marketed as Super Filtrol. The silica-alumina catalyst is preferably made by absorbing a metal oxide such as alumina on precipitated silica gel. I do not limit myself to any particular catalyst or to anw method of making the catalyst since cracking catalysts are well-known and since any conventional catalyst may be employed in the practice of my invention. The catalyst is preferably in the finely divided or powdered state so that it may be readily suspended in hydrocarbon vapors and carried through the system, as will be hereinafter described. The particle size of the powdered catalyst should be as large and uniform as feasible in order to facilitate subsequent separation.

About 1 to 15 volumes of powdered catalyst, preferably about 2 to 3 volumes, are introduced for each volume of liquid gas oil and if desired the catalyst may be dispersed in the gas oil by means of about 2 to 10% of superheated steam. The pressure is preferably about atmospheric to 50 pounds, for example about 25 pounds and the temperature many range from about 800 to 1000° F. but is preferably about 900 to 925° F. The space velocity or contact time will vary with different stocks and desired extents of conversion, but generally speaking I prefer to employ contact times of about 5 to 50 seconds, preferably about 15 to 25 seconds.

The hot conversion products, together with suspended catalyst material are introduced from reactor coils 15 to cyclone separator 18 in which most of the catalyst is separated out and withdrawn through line 19 to an intermediate point of stripping tower 20. Hot vapors with small amounts of suspended catalyst material are passed through heat exchanger 12 and cooler 21, wherein the temperature is reduced to such an extent that a considerable amount of the hydrocarbons is condensed. A mixture of condensed hydrocarbons and vapors is then introduced at an intermediate point of separator 22 which is preferably a cylindrical vessel with baffle plates 23 in its upper portion and with a funnel-shaped member 24 in its lower portion. Apparatus of this general type is commonly used in oil refineries and it is often referred to as a "steamboat separator."

Liquids with suspended catalyst material pass downwardly through the inner part of funnel member 24. A dense catalyst slurry accumulates in the hopper-shaped bottom of separator 22 and liquid released from the dense slurry passes upwardly on the outside of the funnel-shaped member and is withdrawn from the separator by means of line 25 to fractionating column 57. The funnel-shaped member insures quiescence in the settling zone between the funnel-shaped member and the walls of the settler, so that the oil withdrawn through line 25 will be free from suspended catalyst.

Released vapors pass upwardly in separator 22 countercurrent to a downwardly flowing reflux stream introduced by line 26, this reflux medium keeping the baffle plates washed free of catalyst and insuring that no catalyst particles are taken overhead with uncondensed vapors through line 27. Uncondensed vapors pass through condenser 28 after which they are introduced into separator 29. Liquids from the separator are withdrawn through line 30 and either passed by pump 31 and line 26 to the top of separator 22 to serve as reflux or are introduced through line 32 to fractionating column 57.

The concentrated catalyst slurry from the base of separator 22 is forced by pressure screw 33 through perforations in plate 34 mounted in the top of drying or stripping tower 20. The slurry rains down through the upper space in this drying tower and, while passing downwardly through said space, it is dried to such an extend that it is no longer pasty or sticky so that when it comes in contact with baffle plates 35 it flows freely thereover to the base of the stripping tower.

The gas employed for drying the slurry is preferably obtained from the conversion system itself, although it should be understood of course that refinery gases from other sources may be used. Gas from the top of separator 29 is passed by compressor 36 through line 37 and heating coil 38 either through line 39 to the drying section of tower 20 or through line 40 to the stripping section of tower 20. Heating coil 38 may be placed in furnace 14 or it may be heated by flue gases from said furnace or by heat exchange with hot reaction products or by any other suitable source of heat.

This gas is preferably heated to a temperature of about 700 to 1000° F. so that when it is introduced through line 39 into the downwardly raining catalyst slurry in the drying section of tower 20 the oil will be almost instantaneously vaporized and removed from the downwardly falling catalyst particles. By the time these particles reach baffle plates 35 they are therefore substantially as dry as the catalyst which is discharged into tower 20 from cyclone separator 20 through line 19. Such catalyst particles may still retain about 3 to 4% of oil and I therefore pass the catalyst over inclined baffle plates in a stripping section countercurrent to hot stripping gas introduced through line 40. This countercurrent scrubbing of the catalyst with hot hydrocarbon gases removes substantially all of the oil from the catalyst particles and at the same time reheats this catalyst to temperatures of the order of those required for regeneration.

The dried catalyst from the hopper bottom of tower 20 is passed by a star conveyor or rotating valve 41 into chamber 42 into which steam is introduced by line 43 for displacing hydrocarbon gases from the catalyst before it is passed by line 44 to regeneration system 45. The particular conveying and regenerating means form no part of the present invention and they will therefore not be described in further detail.

Drying and stripping gases from tower 20, which may be substantially saturated with oil and which may also contain small amounts of occluded or suspended catalyst material are withdrawn through line 46 and introduced through line 47 at a low point in the baffled section of separator 22. Similarly, steam with entrained vapors, which may also contain small amounts of catalyst, is withdrawn from chamber 42 by line 48 to line 47 and the lower part of the baffled zone in the upper part of separator 22. Thus any catalyst which is suspended in vapors leaving the drying and stripping zones is knocked back by reflux liquid in the upper part of tower 22 so that substantially no catalyst material is lost.

The fractionator 57 may be of any conventional type and may be provided with suitable reflux means 49 and reboiler means 50, gases being taken overhead through line 51, gasoline as a side stream through line 52 and gas oil from the bottom through line 53. A part or all of this gas oil may be recycled by line 54 and pump 55 to line 13 for further conversion. This recycling will be particularly necessary or useful if instead of employing heat exchanger 12 the gas oil charge is introduced through line 56 directly into the stream of hot reaction products to effect quenching and partial condensation. When this method of cooling the reaction products is employed the gas oil charge to the reaction zone will come through line 54.

While I have described in detail a preferred modification of my invention it should be understood that many alternatives, equivalents and modifications thereof will be apparent to those skilled in the art. For instance, instead of employing the steamboat separator for removing liquid from suspended catalyst I may employ a filter of any conventional type. Instead of employing a pressure screw extrusion system for dispensing catalyst slurry in the drying section of tower 20 I may employ any equivalent means for dispensing or atomizing said slurry. A water trapout will probably be included between condenser 28 and separator 29 or water may be withdrawn as a separate stream from separator 29 in case steam is used in line 17 or line 43. The provision of such water trapouts is, of course, well-known to those skilled in the art and since such details would confuse rather than illustrate the invention they have not been included in the drawing.

When the invention is applied to catalytic reforming, dehydrogenation, aromatization, etc. the entire system may be operated under a pressure which may range from 50 to 450 pounds per square inch, and in this case the hydrogen or impure gases containing hydrogen will serve as the hot drying gas and hot stripping gas for introduction through lines 39 and 40. In like manner the invention may be applied to the various other hydrocarbon conversion processes hereinabove enumerated.

I claim:

1. The method of separating catalyst from oil in a powdered catalyst hydrocarbon conversion system which comprises cooling hydrocarbon vapors containing suspended catalyst, whereby a part of said vapors are condensed and the catalyst material is suspended in the condensate, separating catalyst-free oil from said condensate whereby a concentrated oil-catalyst slurry remains, drying said oil-catalyst slurry with a hot gas containing normally gaseous hydrocarbons and stripping the dried catalyst with hot hydrocarbon gas for removing substantially all of the occluded oil therefrom and simultaneously heating the catalyst preparatory to regeneration.

2. The method of separating catalyst from oil in a powdered catalyst hydrocarbon conversion system which comprises cooling a mixture of vapors and suspended catalyst to effect partial condensation, whereby the catalyst is suspended as an oil slurry in said condensate, drying said slurry with a hot hydrocarbon gas to form an enriched gas, and commingling the enriched drying gas with vapors from said partial condensation step.

3. The method of claim 2 which includes the further step of scrubbing the vapors from the partial condensation step and the enriched vapors for the removal of suspended catalyst materials therefrom.

4. The method of separating oil from catalyst in an oil catalyst slurry which comprises disseminating said slurry into a gaseous atmosphere and contacting said disseminated slurry with a hot gas comprising normally gaseous hydrocarbons introduced into said drying zone at a temperature of about 700 to 1000° F., whereby the catalyst material passes through the pasty state while it remains dispersed in said gaseous atmosphere.

5. The method of separating catalyst from oil in a suspended catalyst hydrocarbon conversion process which comprises introducing a hot mixture of suspended catalyst in petroleum vapors into a vapor-catalyst separation zone, removing most of the catalyst from the vapors in said zone and passing the removed catalyst to a stripping zone, cooling the vapors from the vapor-catalyst separation zone to effect partial condensation thereof, whereby the remaining catalyst is suspended in condensate as a slurry, separating catalyst-free oil from said slurry, drying said slurry by removing oil therefrom, commingling the dried slurry with the catalyst removed in the vapor-catalyst separation zone and stripping the remaining oil from said commingled catalyst in the stripping zone by the use of hot gases.

6. The method of claim 5 wherein the hot gases comprise hydrocarbons from the hydrocarbon conversion process.

7. The method of claim 5 which includes the further step of scrubbing the remaining vapors after said partial condensation thereof for removing catalyst therefrom.

8. The method of separating catalyst material from oil in a suspended catalyst hydrocarbon conversion system which comprises separating catalyst from vapors in primary separation step, partially condensing vapors from the primary separation step to form a condensate catalyst slurry, scrubbing uncondensed vapors from the partial condensation for removing catalyst from said uncondensed vapors and combining said catalyst with said slurry, separating catalyst-free oil from said slurry, drying and stripping said slurry with a hot gas, and simultaneously stripping the catalyst removed in the primary separation zone together with said dried slurry.

9. The method of separating oil from catalyst material which comprises passing oil-containing catalyst through a stripping zone counter-current to a stream of hot hydrocarbon gases introduced into said zone at a temperature of about 700 to 1000° F. and subsequently purging said catalyst material from stripping gases by means of steam.

10. A hydrocarbon conversion process which comprises suspending a powdered catalyst in oil vapors, contacting said oil vapors with said suspended catalyst for about 5 to 50 seconds at a pressure of atmospheric to 50 pounds per square inch and at a temperature of about 800 to 1000° F. for effecting hydrocarbon conversion, mechanically separating most of the suspended catalyst from the vapors at substantially reaction temperature, cooling the vapors from which most of the catalyst has been separated to effect a partial condensation of the vapors and to form a slurry of the remaining catalyst in the condensate, scrubbing the uncondensed vapors for removing catalyst material therefrom and combining said removed catalyst with said slurry, stripping oil from the catalyst removed in the mechanical separation step and the catalyst contained in the slurry, regenerating the catalyst which has thus been freed from oil and returning the regenerated catalyst for reuse in the conversion process while said catalyst retains regeneration heat whereby the heat retained by the catalyst may be imparted to the oil vapors in which the regenerated catalyst is resuspended.

11. The method of claim 10 which includes the steps of heating a hydrocarbon-containing gas to a temperature of at least 700° F., employing said heated gas as the stripping agent in said stripping step whereby oil is removed from the catalyst and the gas is enriched with oil and scrubbing the enriched gas along with said uncondensed vapors for recovery of catalyst material suspended therein.

12. The method of separating catalyst from oil which comprises partially condensing hydrocarbon vapors containing suspended catalyst to form a catalyst slurry, scrubbing uncondensed vapors for recovering catalyst therefrom and combining said catalyst with the catalyst in said slurry, separating catalyst-free oil from said slurry, removing the remainder of the oil from said slurry by contacting it with a hot gas whereby the catalyst is dried and the gas becomes enriched with oil, and scrubbing the enriched gas along with said uncondensed vapors for recovering catalyst material therefrom.

13. The method of claim 12 which includes the further steps of partially condensing said uncondensed vapors to obtain a second condensate and a gas, returning at least a part of said second condensate of the scrubbing liquid to said vapor scrubbing step, heating said gas to elevated temperature and employing said heated gas for effecting the recovery of oil from said catalyst slurry.

14. A hydrocarbon conversion process which comprises contacting oil with a suspended catalyst for about 5 to 50 seconds at a pressure of about atmospheric to 50 pounds per square inch and a temperature of about 800 to 1000° F. separating most of the catalyst from the reaction vapors prior to condensation thereof and introducing the removed catalyst to a stripping zone, partially condensing the remaining vapors whereby catalyst oil slurry is formed by said condensate, scrubbing uncondensed vapors for removing catalyst therefrom, partially condensing the uncondensed vapors for obtaining a gas fraction and a liquid fraction, heating said gas fraction to an elevated temperature, removing catalyst-free oil from said catalyst slurry to a fractionating zone, contacting wet catalyst with said heated gas in said stripping zone whereby the catalyst is dried and the gas becomes enriched, and introducing said enriched gas into said scrubbing step.

15. The process of claim 10 wherein the cooling of the vapors from which most of the catalyst has been separated is effected by heat exchange with incoming charging stock.

16. The method of claim 10 wherein the cooling of the vapors from which most of the catalyst has been separated is effected by introducing a quenching oil directly into the vapor stream.

DONALD E. PAYNE.